(12) United States Patent
Iwata

(10) Patent No.: US 9,846,418 B2
(45) Date of Patent: Dec. 19, 2017

(54) ENERGY CONTROL SYSTEM, ENERGY CONTROL DEVICE, AND ENERGY CONTROL METHOD FOR PRIORITIZING A POWER GENERATION SOURCE BASED ON THE POSSIBILITY OF SELLING GENERATED POWER

(71) Applicant: KYOCERA CORPORATION, Kyoto (JP)

(72) Inventor: Kei Iwata, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 671 days.

(21) Appl. No.: 14/348,558

(22) PCT Filed: Sep. 28, 2012

(86) PCT No.: PCT/JP2012/006240
§ 371 (c)(1),
(2) Date: Mar. 28, 2014

(87) PCT Pub. No.: WO2013/046713
PCT Pub. Date: Apr. 4, 2013

(65) Prior Publication Data
US 2014/0236368 A1 Aug. 21, 2014

(30) Foreign Application Priority Data
Sep. 28, 2011 (JP) .................................. 2011-212973

(51) Int. Cl.
G05B 15/02 (2006.01)
H02J 1/14 (2006.01)
(Continued)

(52) U.S. Cl.
CPC ............. G05B 15/02 (2013.01); H02J 1/14 (2013.01); H02J 3/008 (2013.01); H02J 3/14 (2013.01); H02J 3/383 (2013.01); *Y02E 10/563* (2013.01)

(58) Field of Classification Search
None
See application file for complete search history.

(56) References Cited

U.S. PATENT DOCUMENTS 4,405,029 A * 9/1983 Hunt ..................... B60K 6/24
180/303
5,908,077 A * 6/1999 Moore ................... B60K 6/40
180/2.2
(Continued)

FOREIGN PATENT DOCUMENTS

JP 2002-199592 A 7/2002
JP 2003-116224 A 4/2003
(Continued)

OTHER PUBLICATIONS

Office Action dated Mar. 22, 2016, issued in counterpart Japanese Application No. 2013-535938.
(Continued)

*Primary Examiner* — Wissam Rashid
(74) *Attorney, Agent, or Firm* — Procopio Cory Hargreaves and Savitch LLP

(57) ABSTRACT

An energy control system (1) includes a photovoltaic power generation unit (10) that is connected to the grid and generates power using sunlight, a gas power generation unit (20) that generates power using gas, and a control unit (40) that performs control to supply a load by prioritizing the power generated by the gas power generation unit (20) when sale of the power generated by the photovoltaic power generation unit (10) to the grid is possible and to supply the
(Continued)

load by prioritizing the power generated by the photovoltaic power generation unit (10) when the sale is not possible.

15 Claims, 6 Drawing Sheets

(51) Int. Cl.
*H02J 3/00* (2006.01)
*H02J 3/14* (2006.01)
*H02J 3/38* (2006.01)

(56) References Cited

U.S. PATENT DOCUMENTS

| | | | | |
|---|---|---|---|---|
| 2003/0075211 A1* | 4/2003 | Makita | ............... | F24J 2/5237 |
| | | | | 136/244 |
| 2009/0312903 A1* | 12/2009 | Hafner | ............... | B60L 8/003 |
| | | | | 701/36 |
| 2010/0145560 A1* | 6/2010 | Komatsu | ............ | B60K 6/365 |
| | | | | 701/22 |
| 2010/0156185 A1* | 6/2010 | Kim | ............... | H01M 16/003 |
| | | | | 307/72 |
| 2011/0241550 A1* | 10/2011 | Imam | ............... | H05B 41/28 |
| | | | | 315/119 |
| 2012/0299383 A1 | 11/2012 | Cyuzawa et al. | | |

FOREIGN PATENT DOCUMENTS

| | | |
|---|---|---|
| JP | 2005-102432 A | 4/2005 |
| JP | 2007-104775 A | 4/2007 |
| JP | 2007-330057 A | 12/2007 |
| JP | 2011-055656 A | 3/2011 |
| JP | 2011-181377 A | 9/2011 |
| WO | 2011/001796 A1 | 1/2011 |

OTHER PUBLICATIONS

The extended European search report issued by the European Patent Office dated May 18, 2015, which corresponds to European Patent Application No. 12836317.3-1804 and is related to U.S. Appl. No. 14/348,558.
International Search Report; PCT/JP2012/006240; dated Oct. 23, 2012.

* cited by examiner

ENERGY CONTROL SYSTEM, ENERGY CONTROL DEVICE, AND ENERGY CONTROL METHOD FOR PRIORITIZING A POWER GENERATION SOURCE BASED ON THE POSSIBILITY OF SELLING GENERATED POWER

CROSS-REFERENCE TO RELATED APPLICATION

This application claims priority to and the benefit of Japanese Patent Application No. 2011-212973 filed Sep. 28, 2011, the entire contents of which are incorporated herein by reference.

TECHNICAL FIELD

The present invention relates to an energy control system, energy control device, and energy control method. In particular, the present invention relates to an energy control system, energy control device, and energy control method for controlling power generated by a photovoltaic power generation unit and a gas power generation unit.

BACKGROUND

Fuel cells are a known way of converting the energy of fuel directly into electrical energy. A typical structure for a fuel cell includes a pair of porous electrodes, i.e. a fuel electrode and an air electrode, with an electrolyte layer therebetween. The fuel electrode is in contact with hydrogen, and the air electrode is in contact with oxygen. A fuel cell with such a structure generates power by electrochemically reacting hydrogen and oxygen.

In a power generation system that uses natural energy, such as photovoltaic power generation or the like, the power generating capability varies depending on the natural environment. As long as fuel and air are supplied, however, a fuel cell can stably provide electrical energy. Therefore, for home power generation during a power outage or the like, a device that uses a fuel cell to support a function for self-sustained operation of power generation while disconnected from the power grid (commercial power supply) is under study (for example, see Patent Literature 1).

Patent Literature 1 proposes a fuel cell system that facilitates an operation to follow a power load of a load device (referred to below simply as a "following operation"). When reforming raw fuel into hydrogen, this fuel cell system uses an exothermic reaction such as a partial oxidation reaction. Therefore, the fuel cell system does not use the exhaust gas from the fuel cell itself as a source of heat for the fuel reforming unit. In response to the power demand and heat demand, this fuel cell system can, within the fuel cell itself, change the amount of raw fuel provided to the fuel reforming unit and the fuel usage rate of the fuel cell itself.

In recent years, research has been conducted on a Home Energy Management System (HEMS) that controls a load device within a home and an energy control system provided with a fuel cell capable of self-sustained operation without receiving power from a power grid (commercial power supply) during a power outage. In such an HEMS, it has been proposed to cause the fuel cell to generate a larger surplus power than the load power consumption within the home in advance and to execute control so as to cause an appropriate load within the home to consume the surplus power. According to such an HEMS, the poor load following capability of the fuel cell can be improved to some degree, and by appropriately consuming the surplus power, a somewhat comfortable environment can be created even during a power outage.

On the other hand, with photovoltaic power generation, the power generating capability varies depending on the natural environment, such as the location of the solar panels, the duration of sunlight, and the like, as described above. Nevertheless, photovoltaic power generation is attracting attention as a technique for generating a substantially inexhaustible supply of power as long as sunlight is available. Furthermore, when a photovoltaic power generation device installed in an average home or the like, for example, produces surplus power while generating power, the surplus power can be sold to the power grid under predetermined conditions.

The power that is thus sold to the power grid can be sold at a relatively high price. Accordingly, by using both fuel cell power generation and photovoltaic power generation, economical operation can be achieved by providing the power generated in the fuel cell to a load device while selling the power generated by photovoltaic power generation to the grid and applying the payment for the sold power to the cost of fuel for the fuel cell.

CITATION LIST

Patent Literature 1: JP2007-104775A

SUMMARY

It might not be possible, however, to sell the above-described power generated by photovoltaic power generation to the grid. Such circumstances include, for example, a power outage, or voltage rise suppression in the photovoltaic power generation device. During the above-described operation, i.e. the operation to use both fuel cell power generation and photovoltaic power generation, losing the ability to sell power to the grid in this way is inconvenient.

First of all, if power generated by photovoltaic power generation cannot be sold, the payment for sold power cannot be applied to the cost of fuel for the fuel cell. Furthermore, power that is generated by photovoltaic power generation but that cannot be sold may be wasted.

To address this problem, it is conceivable for example to store the photovoltaic generated power that cannot be sold in a secondary cell. Even by doing so, however, there is still a risk that the power after the secondary cell becomes fully charged will be wasted. Such operation is far from economical.

Accordingly, the present invention has been conceived in light of the above circumstances and provides an energy control system, energy control device, and energy control method capable of economical operation not only when sale of power generated by photovoltaic power generation is possible, but also when the sale of power is not possible.

An energy control system according to a first aspect of the present invention includes a photovoltaic power generation unit connected to a grid and configured to generate power using sunlight; a gas power generation unit configured to generate power using gas; and a control unit configured to perform control to supply a load by prioritizing the power generated by the gas power generation unit when sale of the power generated by the photovoltaic power generation unit to the grid is possible, and to supply a load by prioritizing the power generated by the photovoltaic power generation unit when the sale is not possible.

When the sale is possible and the power generated by the gas power generation unit is not sufficient to supply the load, the control unit preferably performs control to supply the load also with the power generated by the photovoltaic power generation unit.

When the sale is possible and the power generated by the gas power generation unit and the power generated by the photovoltaic power generation unit are not sufficient to supply the load, the control unit preferably performs control to purchase power from the grid.

When the sale is not possible and the power generated by the photovoltaic power generation unit is not sufficient to supply the load, the control unit preferably performs control to supply the load also with the power generated by the gas power generation unit.

When the sale is not possible and power required for the load can be supplied by the power generated by the photovoltaic power generation unit, the control unit preferably instructs the gas power generation unit to perform an idling operation.

When the sale is not possible and the power generated by the gas power generation unit and the power generated by the photovoltaic power generation unit are not sufficient to supply the load, the control unit preferably performs control to purchase power from the grid.

When power cannot be purchased from the grid, the control unit preferably controls the load so as to suppress power consumption.

An energy control device according to a second aspect of the present invention controls a photovoltaic power generation unit connected to a grid and configured to generate power using sunlight; and a gas power generation unit configured to generate power using gas, by performing control to supply a load by prioritizing the power generated by the gas power generation unit when sale of the power generated by the photovoltaic power generation unit to the grid is possible, and to supply a load by prioritizing the power generated by the photovoltaic power generation unit when the sale of the power generated by the photovoltaic power generation unit to the grid is not possible.

An energy control method according to a third aspect of the present invention is for controlling a photovoltaic power generation unit configured to generate power using sunlight and a gas power generation unit configured to generate power using gas and includes determining whether sale of the power generated by the photovoltaic power generation unit to a grid is possible; and performing control to supply a load by prioritizing the power generated by the gas power generation unit when the sale is possible, and to supply a load by prioritizing the power generated by the photovoltaic power generation unit when the sale is not possible.

Furthermore, an energy control device according to a fourth aspect of the present invention is for controlling a photovoltaic power generation unit configured to generate power using sunlight and a gas power generation unit configured to generate power using gas, the energy control device determining whether sale of the power generated by the photovoltaic power generation unit to a grid is possible; and performing control to supply a load by prioritizing the power generated by the gas power generation unit depending on whether the sale is possible, and to supply a load by prioritizing the power generated by the photovoltaic power generation unit when the sale of the power generated by the photovoltaic power generation unit to the grid is not possible.

According to the present invention, it is possible to provide an energy control system, energy control device, and energy control method capable of economical operation not only when sale of power generated by photovoltaic power generation is possible, but also when the sale of power is not possible.

BRIEF DESCRIPTION OF DRAWINGS

The present invention will be further described below with reference to the accompanying drawings, wherein.

DESCRIPTION OF EMBODIMENTS

The following describes an embodiment of the present invention with reference to the drawings.

Figure 1:
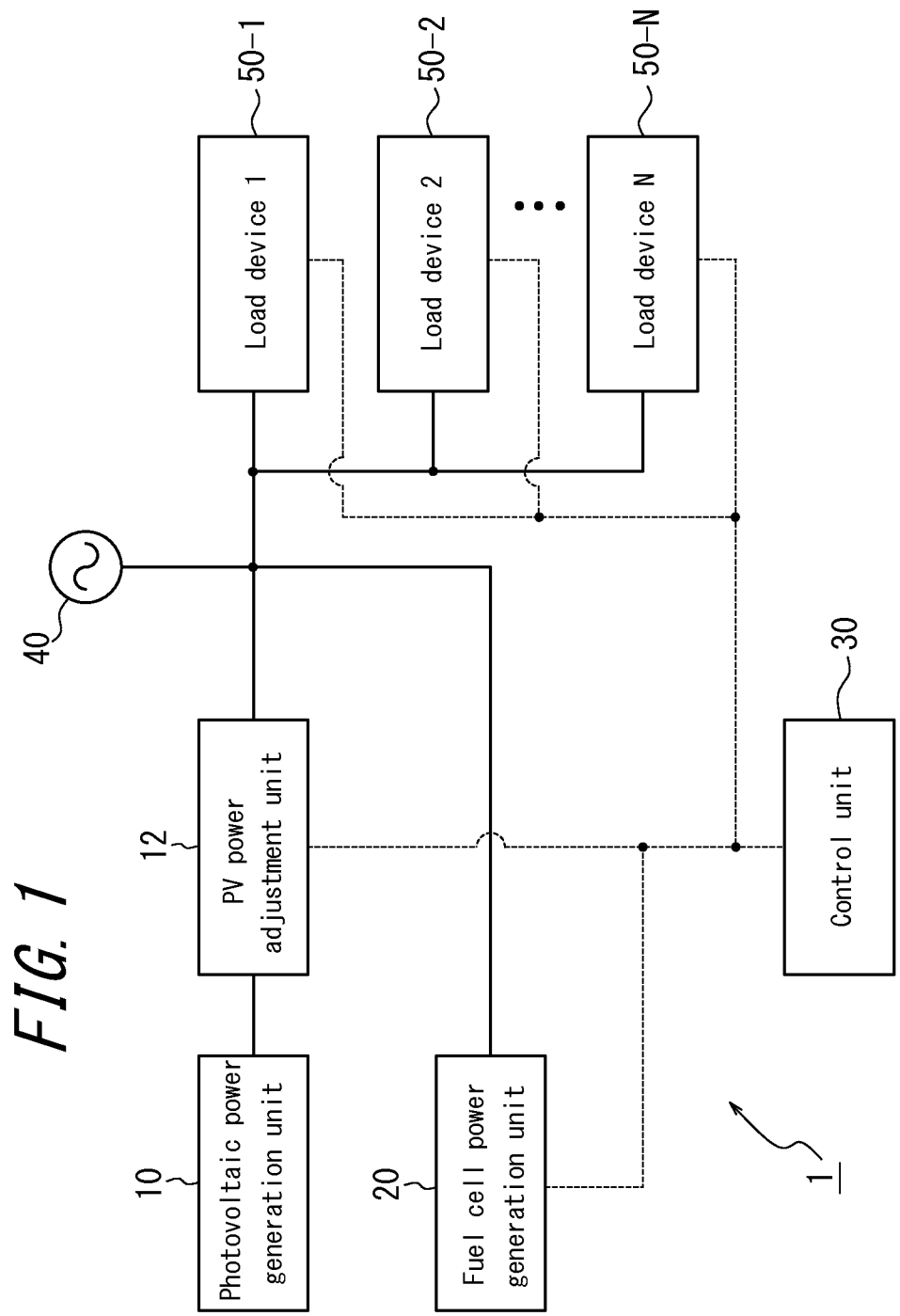
FIG. 1 schematically illustrates an exemplary structure of an energy control system according to an embodiment of the present invention.

FIG. 1 schematically illustrates an exemplary structure of an energy control system according to an embodiment of the present invention.

As illustrated in FIG. 1, an energy control system 1 according to the present embodiment includes a photovoltaic power generation unit 10, a PV power adjustment unit 12, a fuel cell power generation unit 20, and a control unit 30. In FIG. 1, control lines indicating the exchange of control signals between functional units are represented with dashed lines, whereas the power lines indicating the flow of power between functional units are represented with solid lines. Each control line may be wired or wireless. Furthermore, each control line may use a protocol unique to the manufacturer, yet signal transmission and reception preferably conforms to a standard protocol such as ECHONET Lite or ZigBee (trademark).

The photovoltaic power generation unit 10 generates power using sunlight. Therefore, the photovoltaic power generation unit 10 is provided with a solar cell and converts energy from sunlight directly to electrical power. In the present embodiment, the photovoltaic power generation unit 10 is assumed to generate power using sunlight with a solar panel installed, for example, on the roof of a house. In the present invention, however, as long as the photovoltaic power generation unit 10 can convert energy from sunlight to electrical power, any configuration may be adopted. As illustrated in FIG. 1, the photovoltaic power generation unit 10 is connected to a power grid (commercial power supply) 40 via the PV power adjustment unit 12. In other words, the photovoltaic power generation unit 10 is grid-connected.

The PV (photovoltaic) power adjustment unit 12 adjusts the power that the photovoltaic power generation unit 10 generates using sunlight. In other words, the PV power adjustment unit 12 adjusts the power by controlling the operation method of the photovoltaic power generation unit 10, the generated power, and the like. In the present invention, the PV power adjustment unit 12 may be an element having an adjustment function, such as a PV power conditioner.

The fuel cell power generation unit 20 generates electrical power with a fuel cell that causes an electrochemical reaction between externally supplied gasses, such as hydrogen and oxygen, and can supply the generated power. Accordingly, in the present embodiment, the fuel cell power generation unit 20 forms the gas power generation unit of the present invention. The gas power generation unit of the present invention generates power using gas. In the present embodiment, after the fuel cell is activated, the fuel cell power generation unit 20 can operate without receiving power from the power grid, i.e. is capable of self-sustained operation. In the present embodiment, the fuel cell power generation unit 20 also includes other functional units as necessary, such as a reforming unit, in order to achieve self-sustained operation.

The control unit 30 controls the PV power adjustment unit 12, the fuel cell power generation unit 20, and load device 1 to N (50-1 to 50-N) by exchanging control signals with these functional units. The load device 1-N are collective terms for devices in use by the user, such as a refrigerator, television, air conditioner, lighting equipment, and the like. In the present disclosure, these devices are abbreviated as a "load" as appropriate. In the present invention, the control unit 30 may be an element having a control/management function such as a Home Energy Management System (HEMS), for example. Accordingly, in the present embodiment, the control unit 30 forms the energy control device of the present invention. Details on control by the control unit 30 in the present embodiment are provided below.

An AC power source 40 of the power grid (commercial power supply) 40 represents the supply source of AC power from the power grid. The AC power source 40 of the power grid is referred to below simply as the "power grid 40".

A load device 50 is a collective term for a device, such as a household electrical appliance in use by the user, that receives power supplied by the energy control system 1. Accordingly, it should be noted that the load device 50 is generally not treated as being included in the energy control system 1. As representative examples, a load device 1 (50-1), load device 2 (50-2), and load device N (50-N) are shown in FIG. 1, yet any device used by the user may be connected to the energy control system 1 as the load device 50.

By being provided with the photovoltaic power generation unit 10 and the fuel cell power generation unit 20, the energy control system 1 can be supplied with electrical power generated by both of these units. Furthermore, even when the power supply from the power grid has ceased, such as during a power outage, the photovoltaic power generation unit 10 and the fuel cell power generation unit 20 are each capable of self-sustained operation.

Figure 2:
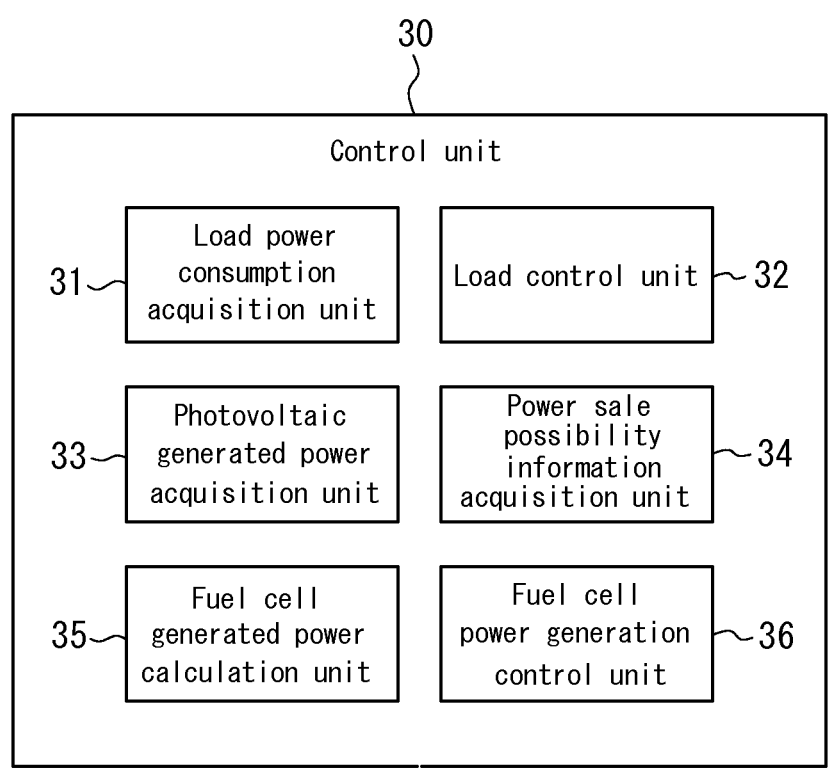
FIG. 2 schematically illustrates an exemplary structure of a control unit in the energy control system in FIG. 1.

FIG. 2 schematically illustrates an exemplary structure of the control unit 30 in FIG. 1.

As illustrated in FIG. 2, the control unit 30 includes a load power consumption acquisition unit 31, a load control unit 32, a photovoltaic generated power acquisition unit 33, a power sale possibility information acquisition unit 34, a fuel cell generated power calculation unit 35, and a fuel cell power generation control unit 36.

The load power consumption acquisition unit 31 acquires information on the power consumption by each load device in the home where the energy control system 1 is installed. The load control unit 32 controls each load device in the home where the energy control system 1 is installed. In greater detail, the load control unit 32 for example performs operation control to change the power consumption of each load device.

From the PV power adjustment unit 12, the photovoltaic generated power acquisition unit 33 acquires information on the power (for example, the amount of power) generated by the photovoltaic power generation unit 10. From the PV power adjustment unit 12, the power sale possibility information acquisition unit 34 acquires information on whether sale of power to the power grid 40 (sale of power to the power company) is possible and, when sale of power is not possible, information on the reason why sale of power is not possible. Reasons why the sale of power is not be possible may, for example, be assumed to include a power outage in the commercial power grid, voltage rise suppression in the photovoltaic power generation unit 10, or the like.

The fuel cell generated power calculation unit 35 calculates information on the power (for example, the amount of power) that the fuel cell power generation unit 20 is caused to generate. The fuel cell power generation control unit 36 controls the operation method of the fuel cell power generation unit 20, the generated power, and the like.

Next, operations of the energy control system 1 according to the present embodiment are described.

Figure 3:
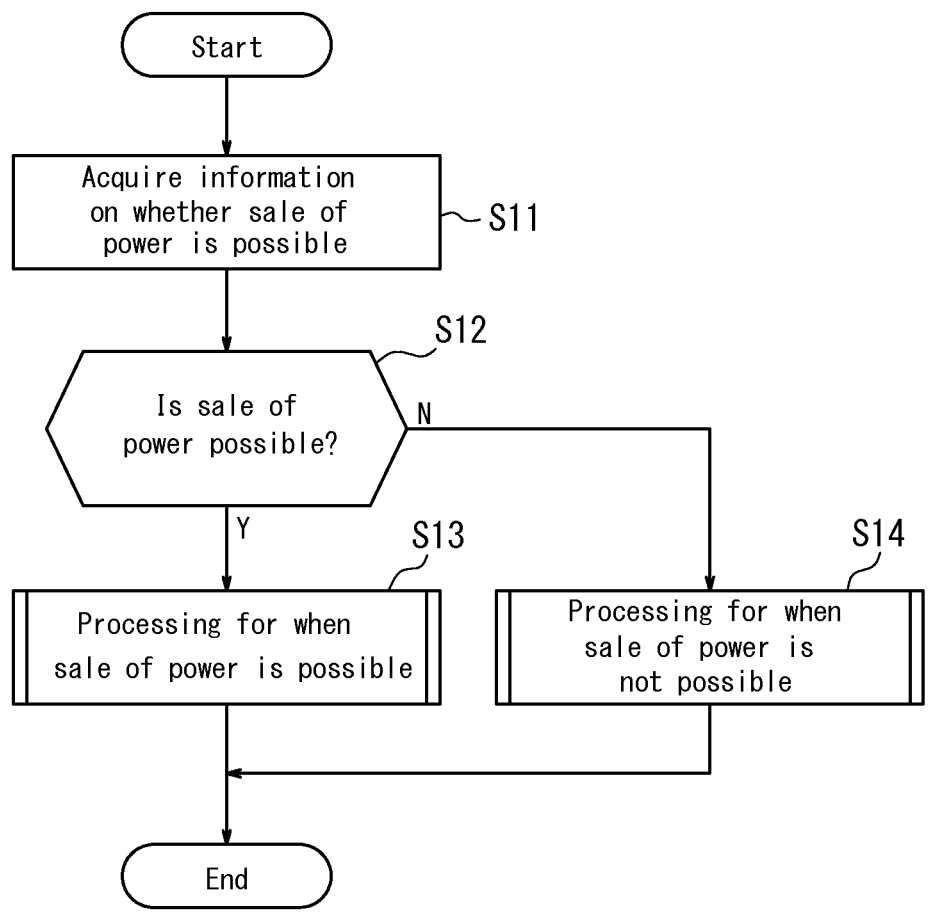
FIG. 3 is a flowchart schematically illustrating processing by the energy control system according to an embodiment of the present invention.

FIG. 3 is a flowchart schematically illustrating processing by the control unit 30 when the energy control system 1 according to the present embodiment is in operation. When the energy control system 1 according to the present embodiment begins to operate, first the power sale possibility information acquisition unit 34 of the control unit 30 acquires information, from the PV power adjustment unit 12, on whether sale of the power generated by the photovoltaic power generation unit 10 is possible (step S11). For acquisition of the information on the possibility of power sale in step S11, notification of the information on the possibility of power sale may be regularly received from the PV power adjustment unit 12. Alternatively, in step S11, the power sale possibility information acquisition unit 34 of the control unit 30 may request information on the possibility of power sale, with the PV power adjustment unit 12 providing notification of the information on the possibility of power sale in response to the request.

Once the power sale possibility information acquisition unit 34 acquires the information on the possibility of power sale in step S11, the control unit 30 determines whether sale of the power generated by the photovoltaic power generation unit 10 is possible (step S12). When sale of the power is possible in step S12, the control unit 30 executes processing for when sale of power is possible (step S13). On the other hand, when sale of the power is not possible in step S12, the control unit 30 executes processing for when sale of power is not possible (step S14). By the control unit 30 repeating the above processing illustrated in FIG. 3 at, for example, predetermined fixed intervals, it is possible to switch to the corresponding processing when a change from a power sellable state to a non-sellable state or from a non-sellable state to a sellable state occurs.

Figure 4:
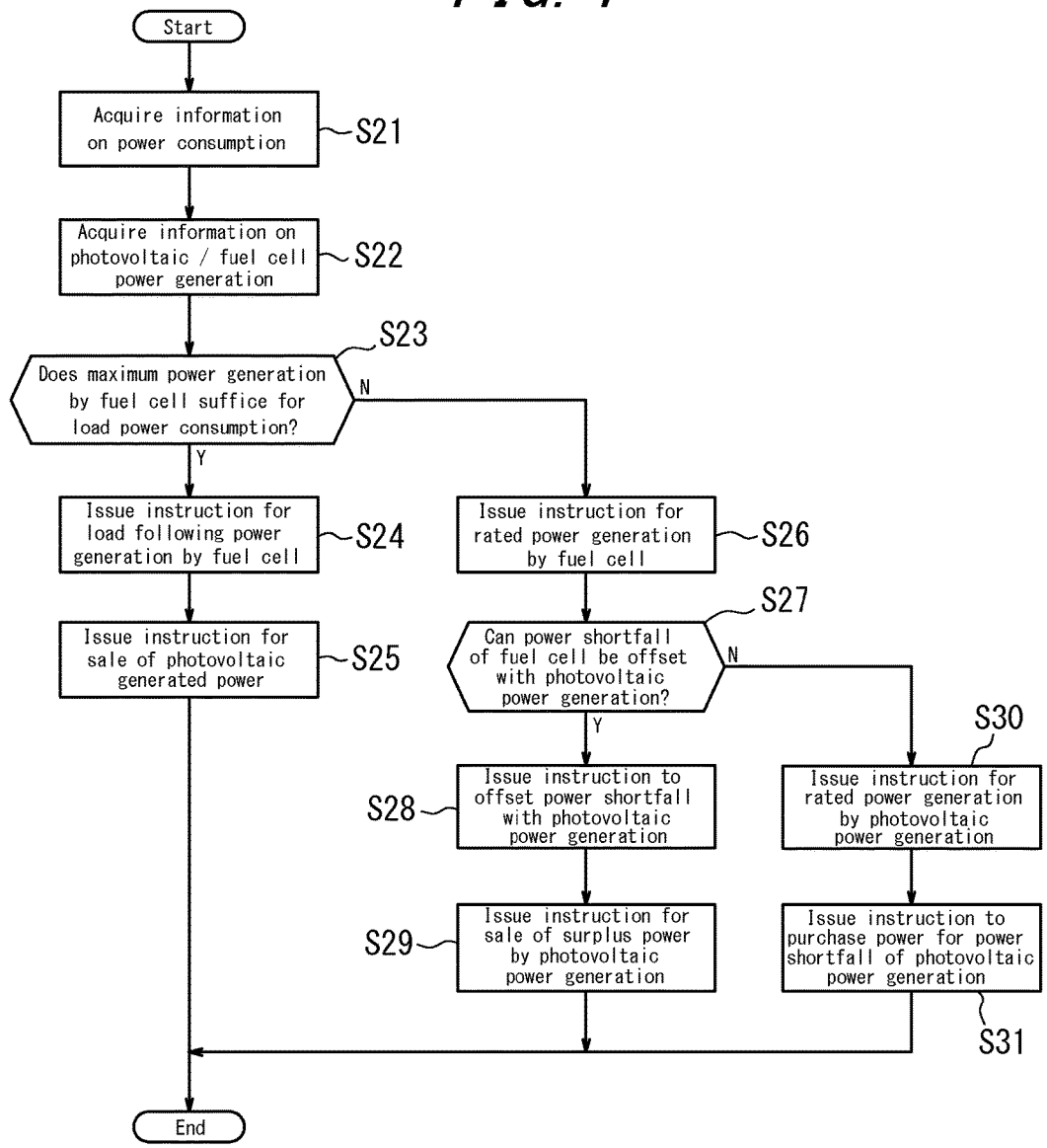
FIG. 4 is a flowchart illustrating processing by the energy control system according to an embodiment of the present invention when sale of power is possible.

FIG. 4 is a flowchart illustrating details on processing by the photovoltaic power generation unit 10 when sale of power is possible in step S13 of FIG. 3. In the description in FIG. 4, it is assumed that sale of the power generated by the photovoltaic power generation unit 10 to the power grid 40 is possible, and that power can be purchased from the power grid 40.

When the processing illustrated in FIG. 4 begins, first the load power consumption acquisition unit 31 of the control unit 30 acquires information on the power consumption of each of the load device 1 to N (50-1 to 50-N) in the home where the energy control system 1 is installed (step S21). The photovoltaic generated power acquisition unit 33 acquires information on the power (for example, the amount of power) that the photovoltaic power generation unit 10 can generate from the PV power adjustment unit 12, and the fuel cell generated power calculation unit 35 calculates the power (for example, the amount of power) that the fuel cell power generation unit 20 can generate (step S22). In step S21 and step S22, the control unit 30 may be notified of each type of information by the functional units, or the control unit 30 may acquire each type of information from the functional units. In this way, the control unit 30 can acquire each type of information from the functional units.

Next, the control unit 30 determines whether the maximum power that can be generated by the fuel cell power generation unit 20 as acquired in step S22 suffices for the power consumption of the load device 1 to N as acquired in step S21 (step S23). When determining in step S23 that the maximum power of the fuel cell power generation unit 20 suffices for the power consumption of the load device 1 to N, the control unit 30 instructs the fuel cell power generation unit 20 to perform load following power generation (step S24). In this case, the fuel cell power generation unit 20 can cover the power consumption of the load device 1 to N even without providing the maximum power generation. Therefore, the control unit 30 controls the fuel cell power generation unit 20 to generate only enough power for the power consumption of the load device 1 to N. Furthermore, in this case, the power generated by the photovoltaic power generation unit 10 becomes surplus power, and therefore the control unit 30 controls the PV power adjustment unit 12 to sell the surplus power (step S25).

On the other hand, when determining in step S23 that the maximum power of the fuel cell power generation unit 20 does not suffice for the power consumption of the load device 1 to N, the control unit 30 instructs the fuel cell power generation unit 20 to perform rated power generation (step S26). In other words, in step S26, the control unit 30 controls the fuel cell power generation unit 20 to provide the maximum power generation.

Next, in step S26, the control unit 30 determines whether the power shortfall, when maximum power generation by the fuel cell power generation unit 20 does not suffice for the power consumption of the load device 1 to N as determined in step S23, can be offset with power generated by the photovoltaic power generation unit 10 (step S27). When determining in step S27 that the power shortfall for the power consumption of the load devices 1 to N can be offset with the maximum power of the photovoltaic power generation unit 10, the control unit 30 issues an instruction to offset the power shortfall with power generated by the photovoltaic power generation unit 10 (step S28). In other words, the control unit 30 controls the PV power adjustment unit 12 so that, within the maximum power generated by the photovoltaic power generation unit 10, power to compensate for the above-described power shortfall for the power consumption of the load device 1 to N is allocated to the load device 1 to N. Furthermore, except for when the above-described power shortfall for the power consumption of the load device 1 to N is equivalent to the maximum power generation of the photovoltaic power generation unit 10, a portion of the maximum power generated by the photovoltaic power generation unit 10 becomes surplus power. In this case, the control unit 30 controls the PV power adjustment unit 12 to sell the surplus power (step S29).

On the other hand, when determining in step S27 that the power shortfall for the power consumption of the load device 1 to N cannot be offset with power generated by the photovoltaic power generation unit 10, the control unit 30 issues an instruction for the photovoltaic power generation unit 10 to perform rated power generation (step S30). In other words, the control unit 30 controls the PV power adjustment unit 12 so that the photovoltaic power generation unit 10 generates the maximum power. In this case, power is not sufficient for the power consumption of the load devices 1 to N even though the fuel cell power generation unit 20 performs rated power generation and the photovoltaic power generation unit 10 also performs rated power generation. Therefore, the control unit 30 issues an instruction for purchase of power from the power grid 40 for the amount of power still required when the maximum power generation of the photovoltaic power generation unit 10 cannot meet the power shortfall for the power consumption of the load device 1 to N that occurs with the maximum power generation by the fuel cell power generation unit 20 (step S31). In other words, the control unit 30 performs control to purchase power for the power shortfall from the power grid 40 and allocate the purchased power appropriately to the load device 1 to N. By the control unit 30 repeating the above processing illustrated in FIG. 4 at, for example, predetermined fixed intervals, it is also possible to respond to a variety of changes in circumstances.

In this way, in the present embodiment, the control unit 30 determines whether sale of the power generated by the photovoltaic power generation unit 10 to the grid is possible. When determining that the sale of the power generated by the photovoltaic power generation unit 10 is possible, the control unit 30 performs control to supply a load by prioritizing the power generated by the fuel cell power generation unit 20. In this context, the load refers to the load device 1 to N (50-1 to 50-N).

Furthermore, in the present embodiment, when the power generated by the fuel cell power generation unit 20 is not sufficient to supply the load, the control unit 30 performs control to supply the load also with the power generated by the photovoltaic power generation unit 10. Furthermore, when the power generated by the fuel cell power generation unit 20 and the photovoltaic power generation unit 10 is not sufficient to supply the load, the control unit 30 performs control to purchase power from the power grid 40.

Figure 5:
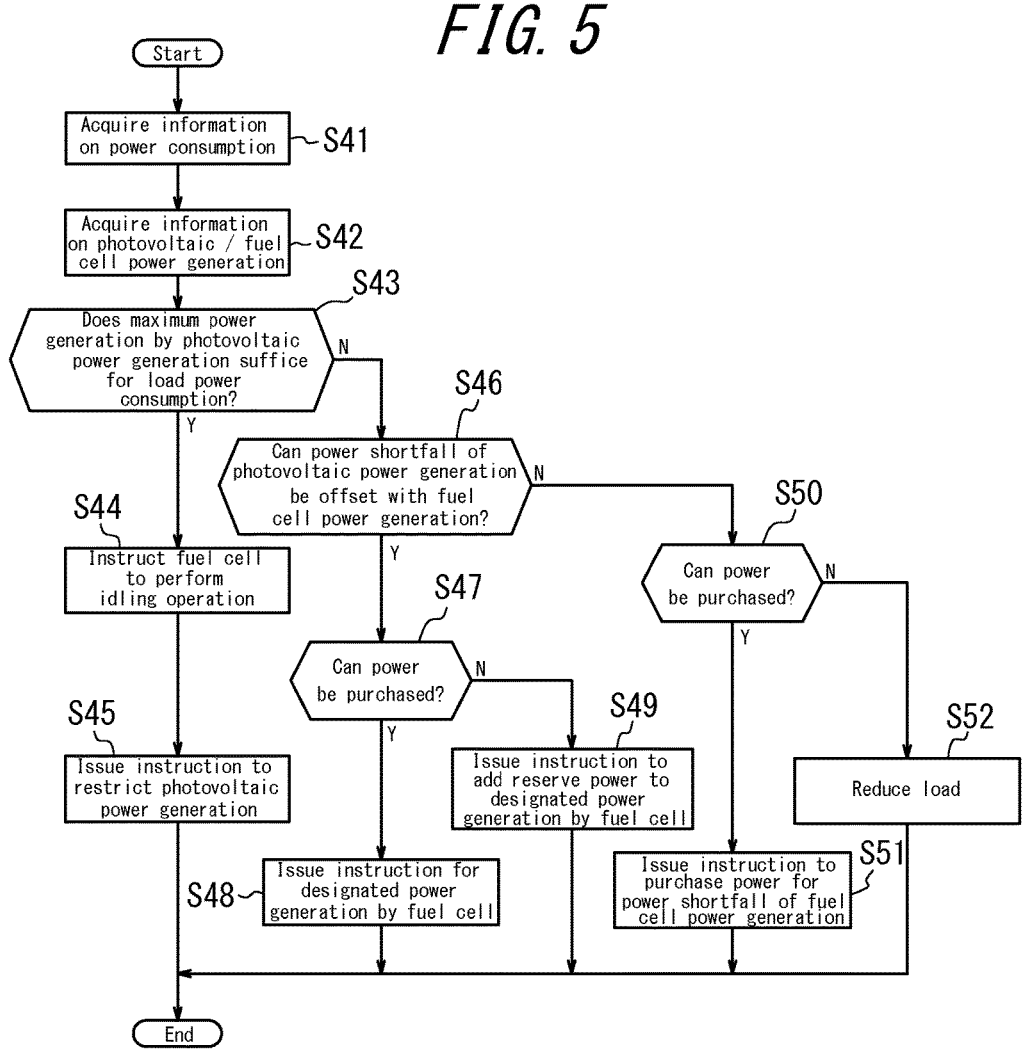
FIG. 5 is a flowchart illustrating processing by the energy control system according to an embodiment of the present invention when sale of power is not possible.

FIG. 5 is a flowchart illustrating details on processing by the photovoltaic power generation unit 10 when sale of power is not possible in step S14 of FIG. 3. As described above, reasons why the sale of power generated by the photovoltaic power generation unit 10 is not be possible may, for example, be assumed to include a power outage, the imposition of voltage rise suppression in the photovoltaic power generation unit 10, or the like. FIG. 5 assumes the case of a change from a state in which sale of power is possible, as illustrated in FIG. 4, to a state in which sale of power is not possible. Accordingly, at the starting point for the processing illustrated in FIG. 5, it is assumed that the photovoltaic power generation unit 10 and the fuel cell power generation unit 20 are both performing rated power generation.

When the processing illustrated in FIG. 5 begins, first the load power consumption acquisition unit 31 of the control unit 30 acquires information on the power consumption of each of the load device 1 to N (50-1 to 50-N) in the home where the energy control system 1 is installed (step S41). The photovoltaic generated power acquisition unit 33 acquires information on the power (for example, the amount of power) that the photovoltaic power generation unit 10 can generate from the PV power adjustment unit 12, and the fuel cell generated power calculation unit 35 calculates the power (for example, the amount of power) that the fuel cell power generation unit 20 can generate (step S42). In step S41 and step S42, the control unit 30 may be notified of each type of information by the functional units, or the control unit 30 may acquire each type of information from the functional units. In this way, the control unit 30 can acquire each type of information from the functional units.

Next, the control unit 30 determines whether the maximum power that can be generated by the photovoltaic power generation unit 10 as acquired in step S42 suffices for the power consumption of the load device 1 to N as acquired in step S41 (step S43). When determining in step S43 that the maximum power of the photovoltaic power generation unit 10 suffices for the power consumption of the load device 1 to N, the control unit 30 instructs the fuel cell power generation unit 20 to perform an idling operation (step S44). Due to the configuration of the fuel cell, operation thereof requires some degree of power, such as for supply of gas. An idling operation by the fuel cell refers to when the fuel cell operates weakly enough to produce enough power for its own operation. When operation of the fuel cell ceases completely without even an idling operation, a relatively long time is required to begin operation again, yielding an extremely poor load following capability. By maintaining the fuel cell in an idling operation state, however, the fuel cell does not require a long time to return to operation.

In this case, the power generated by the photovoltaic power generation unit 10 can cover the power consumption of the load device 1 to N, even if the power from the fuel cell power generation unit 20 is not output externally. Therefore, in order to allow for a break in operation while maintaining a state such that the fuel cell power generation unit 20 can begin operating again at any time, the control unit 30 controls the fuel cell power generation unit 20 to perform an idling operation. Furthermore, in this case, except for when the above-described power consumption of the load devices 1 to N is equivalent to the maximum power generation of the photovoltaic power generation unit 10, a portion of the maximum power generated by the photovoltaic power generation unit 10 becomes surplus power. Accordingly, the control unit 30 issues an instruction to restrict the power generated by the photovoltaic power generation unit 10 so that the photovoltaic power generation unit 10 does not generate surplus power (step S45). In other words, the control unit 30 controls the PV power adjustment unit 12 so that the power generated by the photovoltaic power generation unit 10 is equivalent to the above-described power consumption of the load device 1 to N.

On the other hand, when determining in step S43 that the maximum power of the photovoltaic power generation unit 10 does not suffice for the power consumption of the load device 1 to N, the control unit 30 proceeds to processing in step S46. In step S46, the control unit 30 determines whether the power shortfall for the power consumption of the load device 1 to N even with maximum power generation by the photovoltaic power generation unit 10, as determined in step S43, can be offset with power generated by the fuel cell power generation unit 20 (step S46).

When determining in step S46 that the power shortfall for the power consumption of the load device 1 to N can be offset with the maximum power of the fuel cell power generation unit 20, the control unit 30 determines whether power can be purchased from the power grid 40 (step S47).

As described above, it is assumed that the sale of power generated by the photovoltaic power generation unit 10 may not be possible for reasons such as a power outage, the imposition of voltage rise suppression in the photovoltaic power generation unit 10, or the like. Even when sale of power is not possible, however, it may be possible to purchase power from the power grid 40 when, for example, voltage rise suppression is being imposed on the photovoltaic power generation unit 10 yet no power outage has occurred.

When determining in step S47 that power can be purchased from the power grid 40, the control unit 30 issues an instruction for the fuel cell power generation unit 20 to generate the designated power (step S48). In other words, in step S48, the control unit 30 performs control so that the fuel cell power generation unit 20 supplies the designated power as power to offset the power shortfall for the power consumption of the load device 1 to N occurring even with maximum power generation by the photovoltaic power generation unit 10. In this way, when the fuel cell power generation unit 20 is supplying the designated power, the fuel cell power generation unit 20 performs load following power generation. In general, when a fuel cell is caused to perform load following power generation, a high following capability cannot be expected, and therefore it is assumed that it might not be possible to respond to an increase in the power consumption of the load device. In this case, however, since power can be purchased from the power grid 40, an increase in the power consumption of the load device can be responded to by allocating power purchased from the power grid 40.

When determining in step S47 that power cannot be purchased from the power grid 40, the control unit 30 issues an instruction for the fuel cell power generation unit 20 to add reserve power when generating the designated power (step S49). In other words, in step S49, the control unit 30 performs control so that the fuel cell power generation unit 20 supplies a larger power than the designated power as power to offset the power shortfall for the power consumption of the load device 1 to N occurring even with maximum power generation by the photovoltaic power generation unit 10. As described above, in general, when a fuel cell is caused to perform load following power generation, a high following capability cannot be expected, and therefore it is assumed that it might not be possible to respond to an increase in the power consumption of the load device. In this case, since power cannot be purchased from the power grid 40, an increase in the power consumption of the load device cannot be responded to by allocating power purchased from the power grid 40. Therefore, in step S49, in order to prepare in advance for an increase in the power consumption of the load device, the control unit 30 performs control so that the fuel cell power generation unit 20 generates power after adding reserve power. In this way, even if the power consumption of the load device increases while the fuel cell power generation unit 20 is performing load following power generation, it is possible to respond to an increase of a certain degree.

In the present embodiment, the above-described reserve power is added when it is determined that power cannot be purchased from the power grid 40 in step S47, yet this reserve power may be added based on other conditions. For example, reserve power may be added in cases such as when, judging by the power consumption history, the time of notification that sale of power is not possible is a time period in which the power consumption of the load device varies greatly, and purchase of power is expected to increase due to the load following power generation by the fuel cell power generation unit 20 not being able to keep up with power consumption.

When determining in step S46 that the power shortfall for the power consumption of the load device 1 to N cannot be offset with the maximum power of the fuel cell power generation unit 20, the control unit 30 determines whether power can be purchased from the power grid 40 (step S50).

When determining in step S50 that power can be purchased from the power grid 40, the control unit 30 proceeds to processing in step S51. In step S51, the control unit 30 issues an instruction for purchase of power from the power grid 40 for the amount of power still required when maximum power generation by the fuel cell power generation unit 20 cannot meet the power shortfall for the power consumption of the load device 1 to N that occurs with maximum power generation by the photovoltaic power generation unit 10. In other words, the control unit 30 performs control to purchase power for the power shortfall from the power grid 40 and allocate the purchased power appropriately to the load device 1 to N.

When determining in step S50 that power cannot be purchased from the power grid 40, the control unit 30 issues an instruction to suppress the power consumption of the load device 1 to N (50-1 to 50-N) (step S52). In step S52, the maximum power generation by the photovoltaic power generation unit 10 and the fuel cell power generation unit 20 does not suffice for the power consumption of the load device 1 to N, and power cannot be purchased from the power grid 40. Accordingly, in step S52, the control unit 30 performs control to suppress the power consumption of the load devices 1 to N so that the power consumption of the load device 1 to N becomes equal to or less than the maximum power generation of the photovoltaic power generation unit 10 and the fuel cell power generation unit 20. It is thus possible to avoid a situation in which the entire energy control system 1 goes down due to the power consumption of the load device 1 to N having reached the limit of the power generating capability of the energy control system 1. By the control unit 30 repeating the above processing illustrated in FIG. 5 at, for example, predetermined fixed intervals, it is also possible to respond to a variety of changes in circumstances, such as a change in whether power can be purchased.

In this way, in the present embodiment, the control unit 30 determines whether sale of the power generated by the photovoltaic power generation unit 10 to the grid is possible, and when determining that the sale of power is not possible, performs control to supply the load by prioritizing the power generated by the photovoltaic power generation unit 10. In this context as well, the load refers to the load device 1 to N (50-1 to 50-N).

Furthermore, in the present embodiment, when the power generated by the photovoltaic power generation unit 10 is not sufficient to supply the load, the control unit 30 performs control to supply the load also with the power generated by the fuel cell power generation unit 20. When the power generated by the photovoltaic power generation unit 10 and the fuel cell power generation unit 20 is not sufficient to supply the load, the control unit 30 performs control to purchase power from the grid. However, when power cannot be purchased from the grid, the control unit 30 controls the load so as to suppress power consumption.

In this way, when the cost for power generation by the fuel cell power generation unit 20 is no longer expected to be offset due to an inability to sell surplus power from the photovoltaic power generation unit 10, the energy control system 1 of the present embodiment stops or suppresses operation of the fuel cell power generation unit 20. The energy control system 1 of the present embodiment can therefore suppress the consumption of gas used for power generation by the fuel cell power generation unit 20 and reduce the cost related to fuel insofar as possible. According to the energy control system 1 of the present embodiment, the energy control device (control unit 30) also notifies the fuel cell power generation unit 20 of the power generation necessary for the power consumption of the load device. The energy control device (control unit 30) can also appropriately determine when a power outage occurs, a time period in which the power consumption varies greatly, and the like and can provide notification by adding reserve power to the necessary power generation. Therefore, the energy control system 1 of the present embodiment can improve on the slow load following speed when the fuel cell generates power. Furthermore, in the energy control system 1 of the present embodiment, the energy control device (control unit 30) controls the functional units. Therefore, in the energy control system 1 of the present embodiment, no major modification to the photovoltaic power generation unit 10 and the fuel cell power generation unit 20 is necessary, thereby reducing the cost of the system as a whole.

For the energy control system 1 of the present embodiment, the following further describes an example of specific operations of the energy control system 1 assuming specific values for the power generated by the photovoltaic power generation unit 10 and the fuel cell power generation unit 20.

Figure 6:
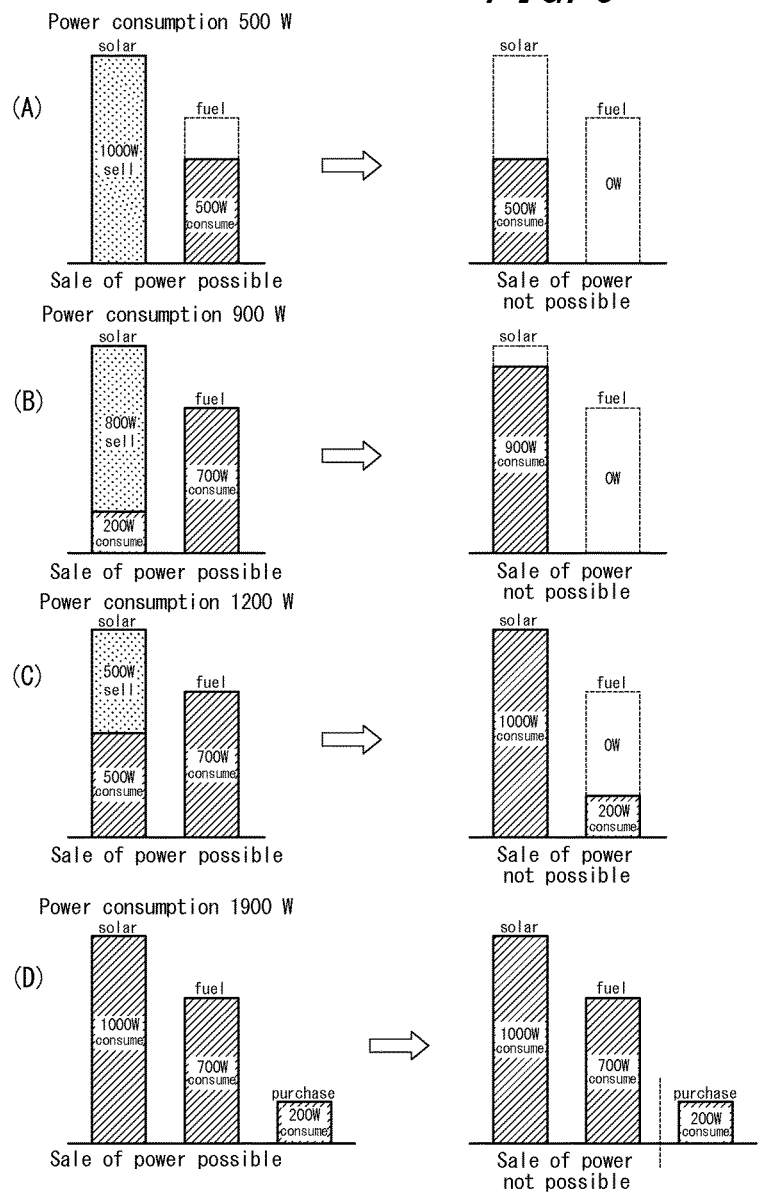
FIG. 6 illustrates an example of operations by the energy control system according to an embodiment of the present invention.

For the energy control system 1 of the present embodiment, the graphs in FIG. 6 illustrate examples of operations when sale of power generated by the photovoltaic power generation unit 10 is and is not possible for various changes in the power consumption of the load device. In each example in FIG. 6, it is assumed that the maximum power that can be generated by the photovoltaic power generation unit 10 at that point is 1000 W, and the rated power generation of the fuel cell power generation unit 20 is 700 W. The power that can be obtained by photovoltaic power generation varies due to factors such as the amount of sunlight, and therefore the maximum power that can be generated by the photovoltaic power generation unit 10 may vary over time. In the bar graphs shown in FIGS. 6(A) to (D), the bar labeled "solar" indicates the status of power generated by the photovoltaic power generation unit 10, and the bar labeled "fuel" indicates the status of power generated by the fuel cell power generation unit 20.

FIG. 6(A) illustrates an example when the total power consumption of the load device 1 to N (50-1 to 50-N) connected to the energy control system 1 is 500 W.

The left side of FIG. 6(A) shows the status of power generated by the photovoltaic power generation unit 10 and the fuel cell power generation unit 20 in the energy control system 1 when sale of power generated by the photovoltaic power generation unit 10 is possible. In other words, when sale of power is possible, the maximum power generation of 700 W by the fuel cell power generation unit 20 suffices for the 500 W power consumption of the load device 1 to N. Accordingly, the fuel cell power generation unit 20 performs load following power generation for the 500 W power consumption of the load device 1 to N, and the 1000 W power generated by the photovoltaic power generation unit 10 is sold (steps S24 and S25 of FIG. 4).

The right side of FIG. 6(A) shows the status of power generated by the photovoltaic power generation unit 10 and the fuel cell power generation unit 20 in the energy control system 1 when sale of power generated by the photovoltaic power generation unit 10 is not possible. In other words, when sale of power is not possible, the maximum power generation of 1000 W by the photovoltaic power generation unit 10 at that point suffices for the 500 W power consumption of the load device 1 to N. Accordingly, the fuel cell power generation unit 20 performs an idling operation, without generating power for the power consumption of the load device 1 to N, whereas the photovoltaic power generation unit 10 is restricted to generating 500 W of power, which are used for the power consumption of the load device 1 to N (steps S44 and S45 of FIG. 5).

FIG. 6(B) illustrates an example when the total power consumption of the load device 1 to N (50-1 to 50-N) connected to the energy control system 1 is 900 W.

The left side of FIG. 6(B) shows the status of power generated by the photovoltaic power generation unit 10 and the fuel cell power generation unit 20 in the energy control system 1 when sale of power generated by the photovoltaic power generation unit 10 is possible. In other words, when sale of power is possible, the maximum power generation of 700 W by the fuel cell power generation unit 20 does not suffice for the 900 W power consumption of the load device 1 to N. Accordingly, the fuel cell power generation unit 20 generates the rated power of 700 W, and all of the generated power is used for the power consumption of the load device 1 to N. The power shortfall of 200 W for the power consumption of the load device 1 to N is offset from the generated power of 1000 W by the photovoltaic power generation unit 10. Furthermore, among the generated power of 1000 W by the photovoltaic power generation unit 10, the surplus 800 W are sold (steps S28 and S29 of FIG. 4).

The right side of FIG. 6(B) shows the status of power generated by the photovoltaic power generation unit 10 and the fuel cell power generation unit 20 in the energy control system 1 when sale of power generated by the photovoltaic power generation unit 10 is not possible. In other words, when sale of power is not possible, the maximum power generation of 1000 W by the photovoltaic power generation unit 10 at that point suffices for the 900 W power consumption of the load device 1 to N. Accordingly, the fuel cell power generation unit 20 performs an idling operation, without generating power for the power consumption of the load device 1 to N, whereas the photovoltaic power generation unit 10 is restricted to generating 900 W of power, which are used for the power consumption of the load device 1 to N (steps S44 and S45 of FIG. 5).

FIG. 6(C) illustrates an example when the total power consumption of the load device 1 to N (50-1 to 50-N) connected to the energy control system 1 is 1200 W.

The left side of FIG. 6(C) shows the status of power generated by the photovoltaic power generation unit 10 and the fuel cell power generation unit 20 in the energy control system 1 when sale of power generated by the photovoltaic power generation unit 10 is possible. In other words, when sale of power is possible, the maximum power generation of 700 W by the fuel cell power generation unit 20 does not suffice for the 1200 W power consumption of the load device 1 to N. Accordingly, the fuel cell power generation unit 20 generates the rated power of 700 W, and all of the generated power is used for the power consumption of the load device 1 to N. The power shortfall of 500 W for the power consumption of the load device 1 to N is offset from the generated power of 1000 W by the photovoltaic power generation unit 10. Furthermore, among the generated power of 1000 W by the photovoltaic power generation unit 10, the surplus 500 W are sold (steps S28 and S29 of FIG. 4).

The right side of FIG. 6(C) shows the status of power generated by the photovoltaic power generation unit 10 and the fuel cell power generation unit 20 in the energy control system 1 when sale of power generated by the photovoltaic power generation unit 10 is not possible. In other words, when sale of power is not possible, the maximum power generation of 1000 W by the photovoltaic power generation unit 10 at that point does not suffice for the 1200 W power consumption of the load device 1 to N. Accordingly, the fuel cell power generation unit 20 generates a designated power of 200 W, and the generated power is used for the power consumption of the load device 1 to N. At this point, if power can be purchased and an increase in power consumption is expected, the fuel cell power generation unit 20 generates power with the above-described designated power being increased by the reserve power, i.e. increased by 200 W. Furthermore, the photovoltaic power generation unit 10 generates the maximum power of 1000 W that can be generated at that point, and all of the generated power is used for the power consumption of the load device 1 to N (steps S48 and S49 of FIG. 5).

FIG. 6(D) illustrates an example when the total power consumption of the load device 1 to N (50-1 to 50-N) connected to the energy control system 1 is 1900 W.

The left side of FIG. 6(D) shows the status of power generated by the photovoltaic power generation unit 10 and the fuel cell power generation unit 20 in the energy control system 1 when sale of power generated by the photovoltaic power generation unit 10 is possible. In other words, when sale of power is possible, the maximum power generation of 700 W by the fuel cell power generation unit 20 and the maximum power generation of 1000 W by the photovoltaic power generation unit 10 at that point do not suffice for the 1900 W power consumption of the load device 1 to N. Accordingly, the fuel cell power generation unit 20 generates the rated power of 700 W, the photovoltaic power generation unit 10 generates the maximum power of 1000 W that can be generated at that point, and all of the generated power is used for the power consumption of the load device 1 to N. The power shortfall of 200 W for the power consumption of the load device 1 to N is offset by purchasing power from the power grid 40 (steps S26, S30, and S31 of FIG. 4). In the bar graph in FIG. 6(D), the bar labeled "purchase" indicates the status of power offset by purchasing power from the power grid 40.

The right side of FIG. 6(D) shows the status of power generated by the photovoltaic power generation unit 10 and the fuel cell power generation unit 20 in the energy control system 1 when sale of power generated by the photovoltaic power generation unit 10 is not possible. In other words, when sale of power is not possible, the maximum power generation of 700 W by the fuel cell power generation unit 20 and the maximum power generation of 1000 W by the photovoltaic power generation unit 10 at that point do not suffice for the 1900 W power consumption of the load device 1 to N. Accordingly, when power can be purchased from the power grid 40, the power shortfall of 200 W for the power consumption of the load device 1 to N is offset by purchasing power from the power grid 40 (step S51, FIG. 5). On the other hand, when power cannot be purchased from the power grid 40, the 1900 W power consumption of the load device 1 to N is reduced to 1700 W (step S52, FIG. 5).

Although the present invention has been described by way of an embodiment with reference to the accompanying drawings, it is to be noted that various changes and modifications will be apparent to those skilled in the art based on the present disclosure. Therefore, such changes and modifications are to be understood as included within the scope of the present invention. For example, the functions and the like included in the members, units, steps, and the like may be reordered in any logically consistent way. Furthermore, units, steps, and the like may be combined into one or divided.

For example, in the structure illustrated in FIG. 1, the gas power generation unit according to the present invention has been described as the fuel cell power generation unit 20. The gas power generation unit according to the present invention, however, is not limited to a power generation unit provided with a fuel cell and may be any power generation unit that can supply power by generating power using gas, such as a power generator that uses a gas turbine engine.

In the above-described embodiment, based on the information acquired by the power sale possibility information acquisition unit 34 of the control unit 30, the control unit 30 determines whether sale of power is possible. In the energy control system according to the present invention, however, instead of the control unit 30 determining whether sale of power is possible, a different functional unit inside or outside of the energy control system may make the determination.

Furthermore, the present embodiment has been described based on an example in which the PV power adjustment unit 12 acquires information related to the whether a power outage has occurred in the commercial power grid, yet alternatively a separate unit from the PV power adjustment unit 12 may be provided for detecting the occurrence of a power outage. In this case, the power sale possibility information acquisition unit 34 acquires information related to a power outage from the separately provided unit for detecting the occurrence of a power outage, determines whether sale of power is possible, and acquires information on the reason why sale of power is not possible.

When determining whether sale of power is possible, the PV power adjustment unit 12 may monitor the direction of current flow from the fuel cell power generation unit 20 in order to determine that sale of power is not possible when the direction of current flow is about to switch towards the commercial power grid. In this case, the power sale possibility information acquisition unit 34 also acquires power sale possibility information based on the direction of flow.

REFERENCE SIGNS LIST

1: Energy control system
10: Photovoltaic power generation unit
12: PV power adjustment unit
20: Fuel cell power generation unit
30: Control unit
40: Power grid
41: Load power consumption acquisition unit
42: Load control unit
43: Photovoltaic generated power acquisition unit
44: Power sale possibility information acquisition unit
45: Fuel cell generated power calculation unit
46: Fuel cell power generation control unit
50: Load device

The invention claimed is:
1. An energy control system comprising:
a photovoltaic power generation unit connected to a grid and configured to generate power using sunlight;
a gas power generation unit configured to generate power using gas; and
a control unit configured to
determine whether sale of the power generated by the photovoltaic power generation unit to the grid is possible,
when the sale is possible, automatically perform control to supply a load by prioritizing the power generated by the gas power generation unit over the power generated by the photovoltaic power generation unit, and,
when the sale is not possible, automatically perform control to supply the load by prioritizing the power generated by the photovoltaic power generation unit over the power generated by the gas power generation unit.

2. The energy control system according to claim 1, wherein when the sale is possible and rated power generated by the gas power generation unit is not sufficient for power required by the load, the control unit performs control to supply the load also with the power generated by the photovoltaic power generation unit.

3. The energy control system according to claim 1, wherein when the sale is possible, and even supplying both the power generated by the gas power generation unit and the power generated by the photovoltaic power generation unit to the load is not sufficient for power required by the load, the control unit performs control to purchase power from the grid.

4. The energy control system according to claim 1, wherein when the sale is not possible and the power generated by the photovoltaic power generation unit is not sufficient for power required by the load, the control unit performs control to supply the load also with the power generated by the gas power generation unit.

5. The energy control system according to claim 1, wherein when the sale is not possible and power required by the load can be supplied by the power generated by the photovoltaic power generation unit, the control unit performs control to reduce generated power of the gas power generation unit.

6. The energy control system according to claim 1, wherein when the sale is not possible, and even supplying both the power generated by the gas power generation unit and the power generated by the photovoltaic power generation unit to the load is not sufficient for power required by the load, the control unit performs control to purchase power from the grid.

7. The energy control system according to claim 6, wherein when power cannot be purchased from the grid, the control unit controls the load so as to suppress power consumption.

8. The energy control system according to claim 1, wherein the photovoltaic power generation unit and the gas power generation unit are located at a home.

9. An energy control device for controlling a photovoltaic power generation unit connected to a grid and configured to generate power using sunlight and a gas power generation unit configured to generate power using gas, the energy control device configured to:
determine whether sale of the power generated by the photovoltaic power generation unit to the grid is possible;
when the sale is possible, automatically perform control to supply a load by prioritizing the power generated by the gas power generation unit over the power generated by the photovoltaic power generation unit; and,
when the sale is not possible, automatically perform control to supply the load by prioritizing the power generated by the photovoltaic power generation unit over the power generated by the gas power generation unit.

10. The energy control device according to claim 9, wherein the photovoltaic power generation unit and the gas power generation unit are located at a home.

11. An energy control method for controlling a photovoltaic power generation unit configured to generate power using sunlight and a gas power generation unit configured to generate power using gas, the method comprising:
determining whether sale of the power generated by the photovoltaic power generation unit to a grid is possible;
when the sale is possible, automatically performing control to supply a load by prioritizing the power generated by the gas power generation unit over the power generated by the photovoltaic power generation unit; and,
when the sale is not possible, automatically performing control to supply the load by prioritizing the power generated by the photovoltaic power generation unit over the power generated by the gas power generation unit.

12. The energy control system according to claim 4, wherein when performing control to supply the load with the power generated by the gas power generation unit, the control unit causes the gas power generation unit to perform a load following operation.

13. The energy control system according to claim 5, wherein when performing control to reduce the generated power of the gas power generation unit, the control unit instructs the gas power generation unit to perform an idling operation.

14. The energy control system according to claim 13, wherein the idling operation is an operation state such that the generated power is reduced to a level at which the gas power generation unit generates, on its own, power necessary for operation by the gas power generation unit.

15. The energy control method according to claim 11, wherein the photovoltaic power generation unit and the gas power generation unit are located at a home.

* * * * *